US010604254B2

(12) United States Patent
O'Brien et al.

(10) Patent No.: US 10,604,254 B2
(45) Date of Patent: Mar. 31, 2020

(54) SYSTEM AND METHOD FOR COORDINATING UNMANNED AERIAL VEHICLES FOR DELIVERY OF ONE OR MORE PACKAGES

(71) Applicant: Walmart Apollo, LLC, Bentonville, AR (US)

(72) Inventors: John J. O'Brien, Farmington, AR (US); Donald R. High, Noel, MO (US); Brian McHale, Oldham (GB); Samantha M. Mangosing, Bella Vista, AR (US); Justin Schuhardt, Montara, CA (US); Robert Cantrell, Herndon, VA (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/264,154

(22) Filed: Jan. 31, 2019

(65) Prior Publication Data

US 2019/0233105 A1    Aug. 1, 2019

Related U.S. Application Data

(60) Provisional application No. 62/624,752, filed on Jan. 31, 2018.

(51) Int. Cl.
*B64C 39/02*      (2006.01)
*G06Q 10/08*     (2012.01)

(52) U.S. Cl.
CPC ......... *B64C 39/024* (2013.01); *G06Q 10/083* (2013.01); *B64C 2201/128* (2013.01); *B64C 2201/141* (2013.01)

(58) Field of Classification Search
CPC ............ B64C 39/024; B64C 2201/128; B64C 2201/141; G06Q 10/083
See application file for complete search history.

(56) References Cited

U.S. PATENT DOCUMENTS 9,454,151 B2    9/2016 Srivastava et al.
9,469,476 B1   10/2016 Ashoori et al.
(Continued)

FOREIGN PATENT DOCUMENTS

WO    2016109000 A2    7/2016

OTHER PUBLICATIONS

International Search Report and Written Opinion dated Apr. 19, 2019, issued in corresponding PCT Application No. PCT/US2019/010692.

*Primary Examiner* — Anshul Sood
(74) *Attorney, Agent, or Firm* — Venable LLP; Jeffri A. Kaminski

(57) ABSTRACT

System and methods for managing one or more unmanned aerial vehicles. The system can include an unmanned aerial vehicle, a landing station for the unmanned aerial vehicle, and a loading station for receiving a package and unmanned aerial vehicle. The unmanned aerial vehicle can be configured to: (i) determine a first confidence level for landing on the landing station, (ii) travel, based on the first confidence level, to the landing station, and (iii) determine a second confidence level for delivering the package to a delivery destination. The loading station can be configured to: (i) receive the second confidence level to deliver the package to the delivery destination from the unmanned aerial vehicle, and (ii) confirm, based on the second confidence level, the unmanned aerial vehicle is capable of delivering the package to the delivery destination.

19 Claims, 13 Drawing Sheets

(56) References Cited

U.S. PATENT DOCUMENTS

| | | |
|---|---|---|
| 9,520,066 B2 | 12/2016 | Spinelli et al. |
| 9,583,007 B2 | 2/2017 | Ubhi et al. |
| 9,691,285 B2 | 6/2017 | Jarrell |
| 9,815,633 B1 | 11/2017 | Kisser et al. |
| 2006/0167599 A1 | 7/2006 | Bodin et al. |
| 2012/0143808 A1 | 6/2012 | Karins et al. |
| 2015/0120094 A1* | 4/2015 | Kimchi ................ B64C 39/024 701/3 |
| 2016/0033966 A1 | 2/2016 | Farris et al. |
| 2016/0335898 A1 | 11/2016 | Caplan et al. |
| 2017/0069214 A1 | 3/2017 | Dupray et al. |
| 2017/0090484 A1 | 3/2017 | Obaidi |
| 2017/0313421 A1 | 11/2017 | Gil |
| 2018/0265296 A1* | 9/2018 | Beckman ............. B65G 1/1373 |
| 2019/0196512 A1* | 6/2019 | Blake .................... G05D 1/104 |

* cited by examiner

US 10,604,254 B2

SYSTEM AND METHOD FOR COORDINATING UNMANNED AERIAL VEHICLES FOR DELIVERY OF ONE OR MORE PACKAGES

PRIORITY

The present application depends from U.S. Provisional Patent Application No. 62/624,752, filed Jan. 31, 2018, the contents of which are incorporated herein in their entirety.

BACKGROUND

1. Technical Field

The present disclosure generally relates to an unmanned vehicle station, and more specifically, systems and methods for coordinating the arrangement of one or more unmanned aerial vehicles for delivery of one or more packages, while confirming that they are able to deliver the package and loading them with them with the package.

2. Introduction

Unmanned aerial vehicles are becoming more common in everyday use, particularly by companies to deliver packages to customers. However, unmanned aerial vehicles are machines, and thus, pose many maintenance challenges and capability limitations. For instance, it is common for unmanned aerial vehicles to routinely need maintenance. Also, it is common for unmanned aerial vehicles to not be able to operate to their full capacity, therefore having limited capabilities. Therefore, a technical problems exists in how to determine which package may be paired with a particular unmanned aerial vehicle. Additional technical problems exist in how to autonomously determine any required maintenance on the unmanned aerial vehicles, and how to pair unmanned aerial vehicles with appropriate packages.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In an embodiment of the present invention, a system for managing one or more unmanned aerial vehicles is provided, including: an unmanned aerial vehicle; a landing station for the unmanned aerial vehicle to land thereon; and a loading station configured to receive a package and the unmanned aerial vehicle. The unmanned aerial vehicle is stationed a location away from the landing station and the loading station. The unmanned aerial vehicle is also in communication with the landing station and configured to: determine a first confidence level for landing on the landing station; travel, based on the first confidence level, to the landing station; and determine a second confidence level for delivering the package to a destination. The loading station is in communication with the unmanned aerial vehicle and configured to: receive the second confidence level to deliver the package to the destination from the unmanned aerial vehicle; and confirm, based on the second confidence level, the unmanned aerial vehicle is capable of delivering the package to the destination.

In an embodiment of the present invention, a system for managing one or more unmanned aerial vehicles is provided, including: an unmanned aerial vehicle; a landing station for the unmanned aerial vehicle to land on; a maintenance station in communication with the landing station and configured to perform maintenance on the unmanned aerial vehicle; a loading station configured to receive the unmanned aerial vehicle from the landing station and to receive the package from the packaging system; and a packaging system in communication with the loading station and including a storage for storing a plurality of packages including the package.

The unmanned aerial vehicle can be configured to: determine a first confidence level for landing on the landing station, and travel, based on the first confidence level, to the landing station or the maintenance station. The loading station can be configured to: receive, from the landing station, the unmanned aerial vehicle; receive, from the packaging system, the package; determine a second confidence level for the unmanned aerial vehicle to deliver the package; select, based on the confidence level, the package for the unmanned aerial vehicle; and instruct, based on the second confidence level, to select and attach to the package for delivery to destination.

In an embodiment of the present invention, a method for managing one or more unmanned aerial vehicles can include: determining, at a landing station, a first confidence level of an unmanned aerial vehicle to land on the landing station; instructing, based on the first confidence level, the unmanned aerial vehicle to land on the landing station; determining, at the landing station, a second confidence level of the unmanned aerial vehicle for maintenance; transporting, based on the second confidence level, the unmanned aerial vehicle to the loading station; identifying, at the packaging system, a package for delivery; determining, at the packaging system, a third confidence level of the unmanned aerial vehicle for delivery of the package; transporting, based on the third confidence level, the package to the loading station; instructing, at the loading station, the unmanned aerial vehicle to select and attach to the package; transporting the unmanned aerial vehicle and the package to a launching station; and launching, at the launching station, the unmanned aerial vehicle and the package to the destination.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. It is also important to note that any reference in the specification to "one embodiment," "an embodiment" or "an alternative embodiment" means that a particular feature, structure or characteristic described in connection with the embodiment is included in at least one embodiment of the invention. As such, the recitation of "in one embodiment" and the like throughout the specification does not necessarily refer to the same embodiment.

The systems and methods disclosed herein are intended to arrange one or more unmanned aerial vehicles for the delivery of a package to a destination. Based on specific configurations, the various embodiments described herein can solve one or more of the technical problems described above. As will be discussed in more detail below, the unmanned aerial vehicles can different capabilities which limit the packages they may deliver, and the packages may have different characteristics which limit the unmanned aerial vehicles that may deliver them. As such, to confirm that the unmanned aerial vehicles are capable to deliver one or more particular packages, the unmanned aerial vehicles can be assessed to confirm that do not need maintenance, are capable of delivering the particular package, informed of a delivery destination of the particular packaged, loaded with particular package, and/or launched with the particular package to the delivery destination.

Figure 1:
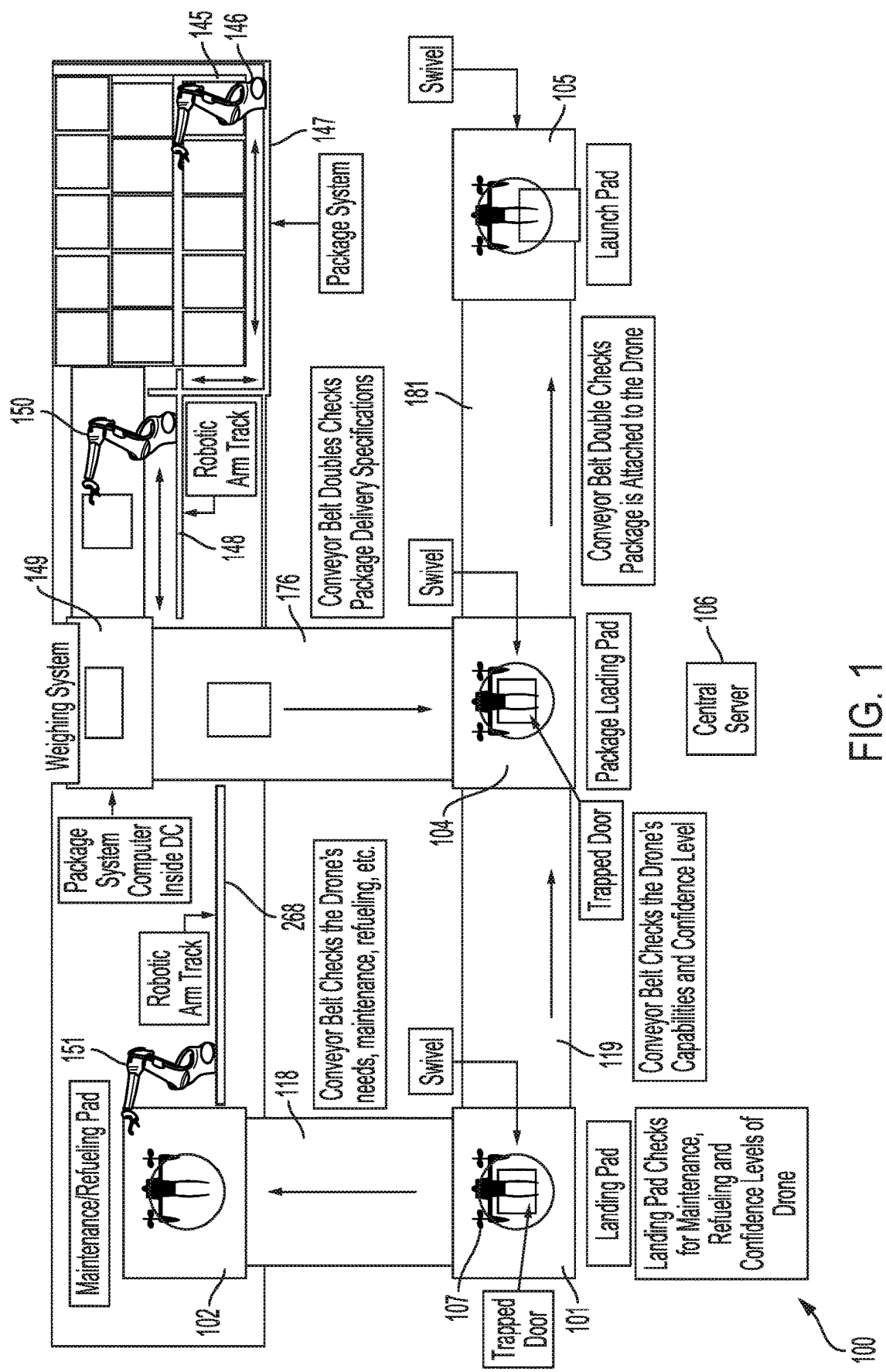
FIGS. 1, 10 and 11 illustrate exemplary systems that can manage one or more unmanned aerial vehicle for delivery of a package to a particular destination in accordance with embodiments of the present invention.

Referring now to the figures, various embodiments of systems for coordinating one or more unmanned aerial vehicles for delivery of one or more packages to various locations and methods thereof will be described. Referring now to FIG. 1, an exemplary system 100 for coordinating the arrangements one or more unmanned aerial vehicles for delivery of a package to a destination is described. The system 100 can include one or more of a landing station 101, a maintenance station 102, a loading station 104, a packaging system 145, an identifying system 149, a launching station 105, and a central server 106. The communication between the landing station 101, the maintenance station 102, the loading station 104, the packing system 145, the identifying system 149, and the launching station 105 can be managed by the central server 106, as will be discussed in more detail below.

The system utilizes two respective confidence levels: first, the confidence that the unmanned aerial vehicle 107 can complete the mission; second, the confidence that the unmanned aerial vehicle 107 can succeed at the mission within needed business parameters, such as delivering a package within a given period of time. With respect to the first confidence level, that the unmanned aerial vehicle 107 can complete the mission, this confidence should approximate one hundred percent, the aeronautical standard for civilian operations. Both confidence levels taken together can provide an overall confidence that the unmanned aerial vehicle can complete its mission, e.g., delivery of the package within a commercially relevant amount of time.

A number of factors should be taken into account into one or both of the respective confidence levels: (1) Spatial limitations, such as the dimensions of the landing zone and/or the range to the target; (2) Temporal limitations, such as a duration of a battery, the speed by which a drone can get to a target; (3) Material considerations, such as the size of the package or the carrying capacity of the UAV; (4) Environmental considerations, such as weather, wildlife, or traffic (land or air); (5) Communication considerations, such as dead zones or areas where communication is limited.

The landing station 101 can be in communication with one or more unmanned aerial vehicles 107. The unmanned aerial vehicle 107 can be located and stationed away from the landing station 101. As such, the landing station 101 can be in communication with the unmanned aerial vehicle 107 to determine if the unmanned aerial vehicle 107 can land at the landing station 101. To do so, the landing station 101 can request a level of confidence from the unmanned aerial vehicle 107 for landing on the landing station 101.

Upon such a request, the unmanned aerial vehicle 107 can determine its level of confidence in landing on the landing station 101. To determine its level of confidence, the unmanned aerial vehicle 107 can consider one or more characteristics of the unmanned aerial vehicle 107 and a size of the landing station. The characteristic of the unmanned aerial vehicle 107 can include one or more of a size, a fuel level, a battery level, and a maintenance status of the unmanned aerial vehicle 107. For example, to determine its level of confidence for landing on the landing station 101, the unmanned aerial vehicle can determine a current battery or fuel level of the unmanned aerial vehicle and a maintenance status of any other component of the unmanned aerial vehicle 107.

As such, if the unmanned aerial vehicle 107 determines its level of confidence meets a predetermined level of confidence for the unmanned aerial vehicle 107 to land on the landing station 101, the unmanned aerial vehicle 107 can land on the landing station 101. However, if the unmanned aerial vehicle 107 does not meet the predetermined level of confidence, the unmanned aerial vehicle 107 can return to a station from which it resides or another location (not illustrated). As such, the level of confidence for the unmanned aerial vehicle 107 to land on the landing station 101 can be within a predefined range of levels of confidence. According to an embodiment, the predefined range can be between −1 and +1. For example, the level of confidence can be intervals, such as "−1," "0," and "+1." The level of confidence of "−1" can refer to the unmanned aerial vehicle 107 not being confident in landing on the landing station 101. The level of confidence of "0" can refer to the unmanned aerial vehicle 107 being somewhat confident in landing on the landing station. The level of confidence of "+1" can refer to the unmanned aerial vehicle 107 being confident it landing on the landing station. According to an embodiment, if the level of confidence for the unmanned aerial vehicle 107 to land on the landing station 101 is "+1," it can proceed to, and land on, the landing station 101. Otherwise, if the level of confidence of the unmanned aerial vehicle 107 to land on the landing station 101 is "−1" or "0," the unmanned aerial vehicle 107 can returns to the station from which it resides (not illustrated). In other configurations, the confidence level can be a range, such as "30% confident in performing the task" or "90% likelihood of failure," and the confidence requirements can require a threshold level be met. Such ranges and thresholds can be used for all instances of confidence scores/requirements as disclosed herein.

Thus, upon meeting the predetermined level of confidence, the landing station 101 can receive the level of confidence from the unmanned aerial vehicle 107. Thereafter, the landing station 101 can inform the central server 106 that the unmanned aerial vehicle 107 is capable of landing on the landing station 101. Along these lines, the central server 106 can indicate a time at which the unmanned aerial vehicle 107 can travel to the landing station 101. By doing so, the central server 106 can ensure that unmanned aerial vehicle 107 does not intersect with other unmanned aerial vehicles traveling to different landing stations.

Figure 2:
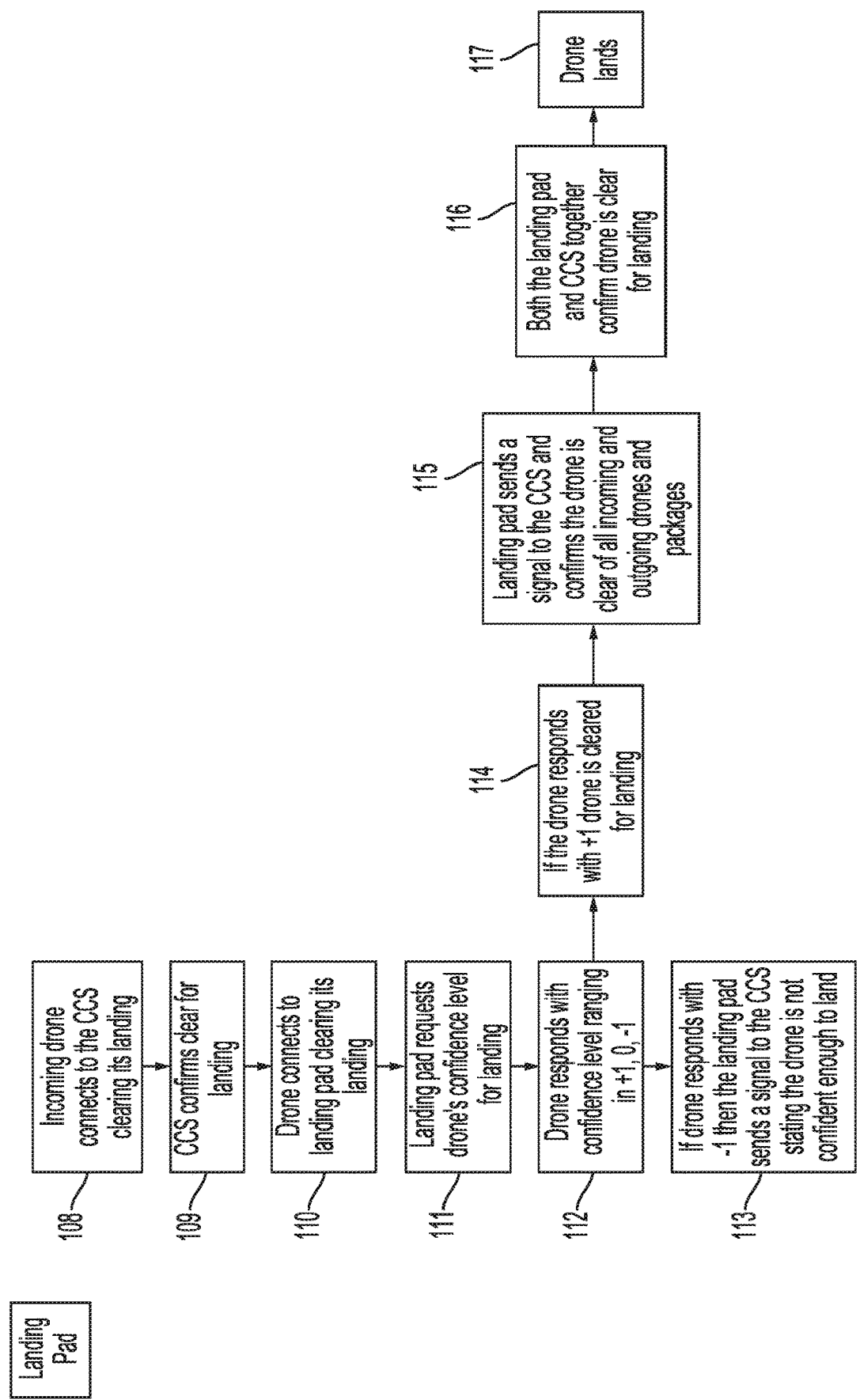
FIGS. 2-5 and 7-9 illustrate exemplary flowcharts describing communication between various components of the system illustrated in FIG. 1 in accordance with embodiments of the invention.

Referring now to FIG. 2, an exemplary flowchart describing communication between various components of the system 100 for the unmanned aerial vehicle 107 to advance to the landing station 101 (each illustrated in FIG. 1) is illustrated. At step 108, the unmanned aerial vehicle 107 can connect to the central server. Thereafter, at step 109, the central server can determine if the unmanned aerial vehicle is clear for traveling to the landing station 101. Upon doing so, at step 110, the unmanned aerial vehicle can connect to the landing station for clearance to land. Subsequently, at step 111, the landing station can request a level of confidence of the unmanned aerial vehicle 107 for landing on the landing station. At step 112, the unmanned aerial vehicle can respond with a level of confidence of "−1," "0," or "+1." Accordingly, as described in step 113, if the unmanned aerial vehicle responds with a level of confidence of "−1," the landing station can send a signal to the central server that it is not confident in landing on the landing station. However, if the unmanned aerial vehicle responds with a level of confidence of "+1," as described in step 114, the landing station can send a signal to the central server to confirm that all incoming and outgoing unmanned aerial vehicles are clear, as described in step 115. By doing so, as described in step 116, the landing station and the central server can together confirm that the unmanned aerial vehicle is clear for landing. Thereafter, at step 117, the unmanned aerial vehicle can land on the landing station.

Referring back to FIG. 1, when the unmanned aerial vehicle 107 lands on the landing station 101, the landing station 101 can determine whether the unmanned aerial vehicle 107 proceeds to the maintenance station 102 or the loading station 104. To do so, the landing station 101 can request, from the unmanned aerial vehicle 107, a level of confidence for maintenance of the unmanned aerial vehicle 107. As described above with respect to landing on the landing station 101, the unmanned aerial vehicle 107 can determine if its level of confidence for maintenance meets a predetermined level of confidence within a predefined range. The maintenance can relate to maintenance of any component of the unmanned aerial vehicle, including, but not limited to, energy, fuel, propellers, sensors, actuators, and communication modules. Along these lines, the maintenance performed on the unmanned aerial vehicle 107 can relate to delivery of a package to a delivery destination. For instance, the maintenance performed on the unmanned aerial vehicle 107 can be to permit delivery of the package to the delivery destination.

As such, if the unmanned aerial vehicle 107 meets the predetermined level of confidence, the unmanned aerial vehicle 107 can go to the loading station 104. Otherwise, the unmanned aerial vehicle 107 can go to the maintenance station 102. According to an embodiment, the predefined range can be between −1 and +1. For example, the level of confidence can be intervals, such as "−1," "0," and "+1." The level of confidence of "−1" or "0" can refer to the unmanned aerial vehicle 107 needing maintenance. The level of confidence of "+1" can refer to the unmanned aerial vehicle 107 not needing maintenance.

Moreover, the landing station 101 can include one or more of a rotating swivel and a trap door. The rotating swivel can rotate and connect to either a first transportation mechanism 118 or a second transportation mechanism 119, as will be discussed in more detail below. In doing so, the rotating swivel can direct the unmanned aerial vehicle 107 towards either the first transportation mechanism 118 or the second transportation mechanism 119. As such, the unmanned aerial vehicle 107 can be instructed to land on the swivel of the landing station 101. As to the trap door, it can hold and/or maintain the unmanned aerial vehicle 107 in place until it is determined if it is going to the maintenance station 102 or the loading station 104. At such time, the trap door can permit the unmanned aerial vehicle 107 to proceed to the maintenance station 102 or the loading station 104

To transport the unmanned aerial vehicle 107 to the maintenance station 102, the landing station 101 can be connected to the maintenance station 102 by a first transportation mechanism 118, and the landing station 101 can be connected to the loading station 104 by a second transportation mechanism 119. The first transportation mechanism 118 can transport the unmanned aerial vehicle 107 to the maintenance station 102, and the second transportation mechanism 119 can transport the unmanned aerial vehicle 107 to the loading station 104. The first transportation mechanism 118 and/or the second transportation mechanism 119 can include a conveyor belt or a plurality of rollers. As illustrated, the first transportation mechanism 118 and the second transportation mechanism 119 can each include a conveyor belt. Along these lines, the first transportation mechanism 118 can check one or more maintenance properties of the unmanned aerial vehicle 107. To do so, the first transportation mechanism 118 can include one or more sensors capable of detecting the maintenance properties of the unmanned aerial vehicle. The maintenance properties can relate to any component of the unmanned aerial vehicle 107, as mentioned above.

Upon arrival to the maintenance station 102, the maintenance station 102 can perform one or more servicing procedures on the unmanned aerial vehicle 107. The maintenance to the unmanned aerial vehicle 107 at the maintenance station 102 can be done by a robotic arm 151. The robotic arm 151 can be a track 268 extending from the maintenance station 102 to the identifying system 149. Although not illustrated, the maintenance to the unmanned aerial vehicle 107 at the maintenance station 102 can be done by an individual.

While the second transportation mechanism 119 transports the unmanned aerial vehicle 107 to the loading station 104, the second transportation mechanism 119 can check one or more capabilities of the unmanned aerial vehicle. To do so, the second transportation mechanism 119 can be able to identify the type of unmanned aerial vehicle 107 and determine its capabilities. The capabilities can include any property relating to operation of the unmanned aerial vehicle in transporting a package. For example, capabilities of the unmanned aerial vehicle can include a fly-time, a flying distance, a maximum miles per hour, a maximum size for package transportation, and a maximum weight for package transportation. As such, the capabilities can relate to one or more properties of the unmanned aerial vehicle in a current state.

Moreover, while the second transportation mechanism 119 transports the unmanned aerial vehicle 107 to the loading station 104, the second transportation mechanism can check a level of confidence for performing one or more capabilities. The level of confidence for the unmanned aerial vehicle 107 for performing a capability can be a predetermined level. The predetermined level can reside within a predefined range. The predefined range can be the same as the predefined range discussed above with respect to the level of confidence for the unmanned aerial vehicle 107 for landing on the landing station 101. For example, the level of confidence for the unmanned aerial vehicle 107 for performing a capability can be −1, 0, or +1. As such, the level of confidence of "−1" can relate to the unmanned aerial vehicle 107 not being confident in performing the capability. The level of confidence of "0" can relate to the unmanned aerial vehicle being confident in performing the capability. The level of confidence of "+1" can relate to the unmanned aerial being confident in performing the capability.

Based on the level of confidence for performing the capability, the unmanned aerial vehicle 107 can send a signal to be matched with a particular package. For example, the unmanned aerial vehicle 107 can be matched with a particular package based on a degree of the level of confidence. For example, if the level of confidence of the unmanned aerial vehicle 107 for performing the capability is "−1," the unmanned aerial vehicle 107 can be deemed able to be confident to meet 25% of the capability and an appropriate package is selected. If the level of confidence of the unmanned aerial vehicle 107 for performing the capability is "0," the unmanned aerial vehicle 107 can be deemed be able to be confident to meet 50% of the capability and an appropriate package is selected. If the level of confidence of the unmanned aerial vehicle 107 for performing the capability is "+1," the unmanned aerial vehicle 107 can be deemed be able to be confident to meet 100% of the capability and an appropriate package is selected. For example, if the unmanned aerial vehicle is capable of carrying 100 pounds but its level of confidence for performing this capability is "−1," the unmanned aerial vehicle will be deemed confidence to carry 25 pounds (e.g., 25% of 100 pounds).

Figure 3:
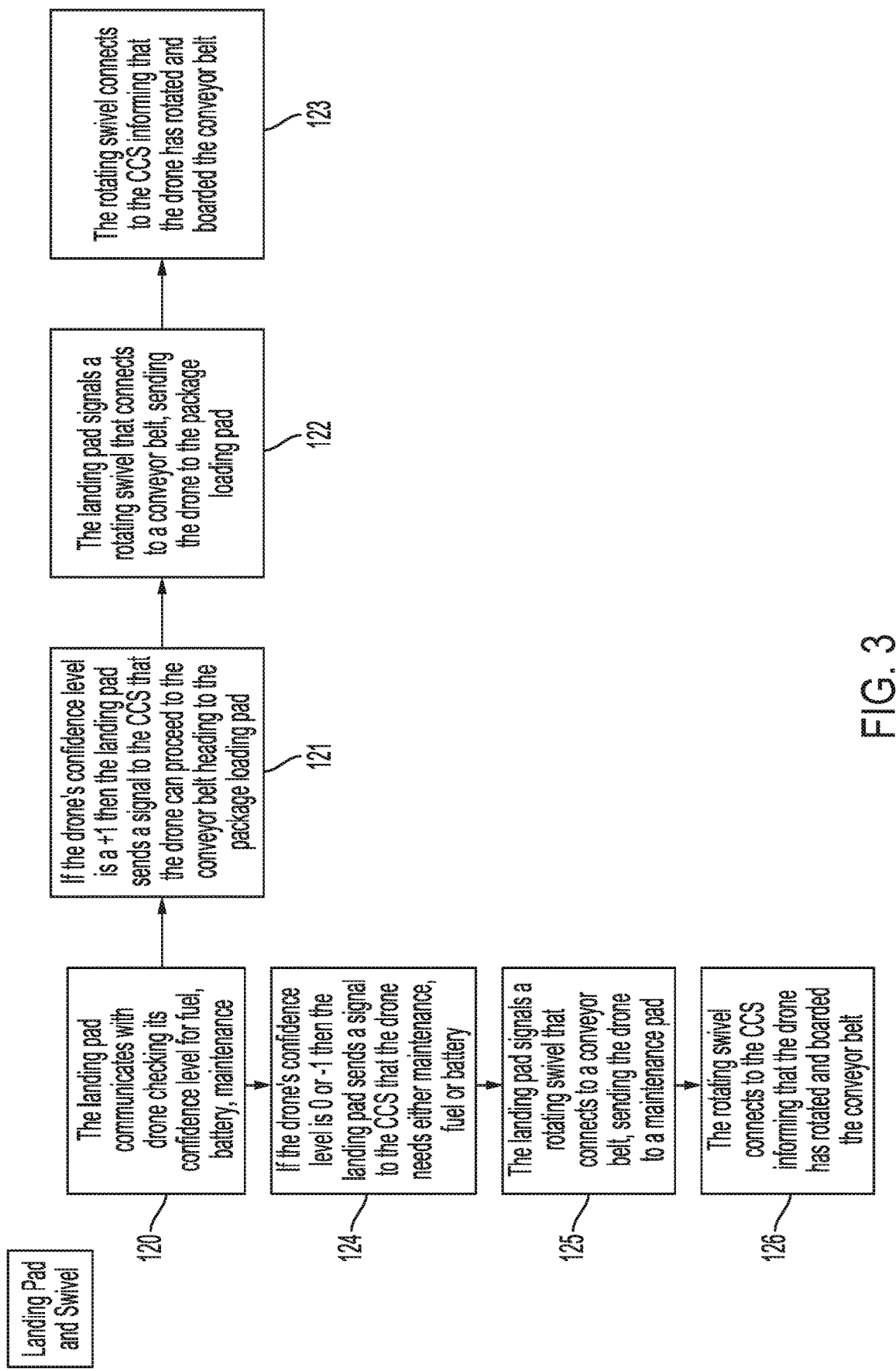

Referring now to FIG. 3, an exemplary flowchart illustrating the communication between various components of the system 101 for determining maintenance of the unmanned aerial vehicle 107 (each shown in FIG. 1) is depicted. Starting at step 120, the landing station 101 can communicate with the unmanned aerial vehicle 107 to determine its confidence level for maintenance, for example, its confidence for fuel, battery, and mechanical maintenance. If the unmanned aerial vehicle 107 has a confidence level for maintenance of "+1," then, as described at step 121, the landing station can send a signal to the central server that the unmanned aerial vehicle does not need maintenance and proceed to the second transportation mechanism for transportation to the loading pad. Thereafter, at step 122, the landing station can signal its rotating swivel to send the unmanned aerial vehicle to the loading pad. Upon doing so, at step 123, the rotating swivel can connect to the central server to inform it that the drone has been rotated and boarded the second transportation mechanism 119.

However, if the unmanned aerial vehicle has a confidence level for maintenance of "−1" or "0," then, as described at step 124, the landing station can send a signal to the central server that the unmanned aerial vehicle needs maintenance. Thereafter, at step 125, the landing station can signal its rotating swivel to send the drone to the maintenance pad. Upon doing so, at step 126, the rotating swivel can connect to the central server to inform that the unmanned aerial vehicle will be boarding the first transportation mechanism for transportation to the maintenance pad.

Figure 4:
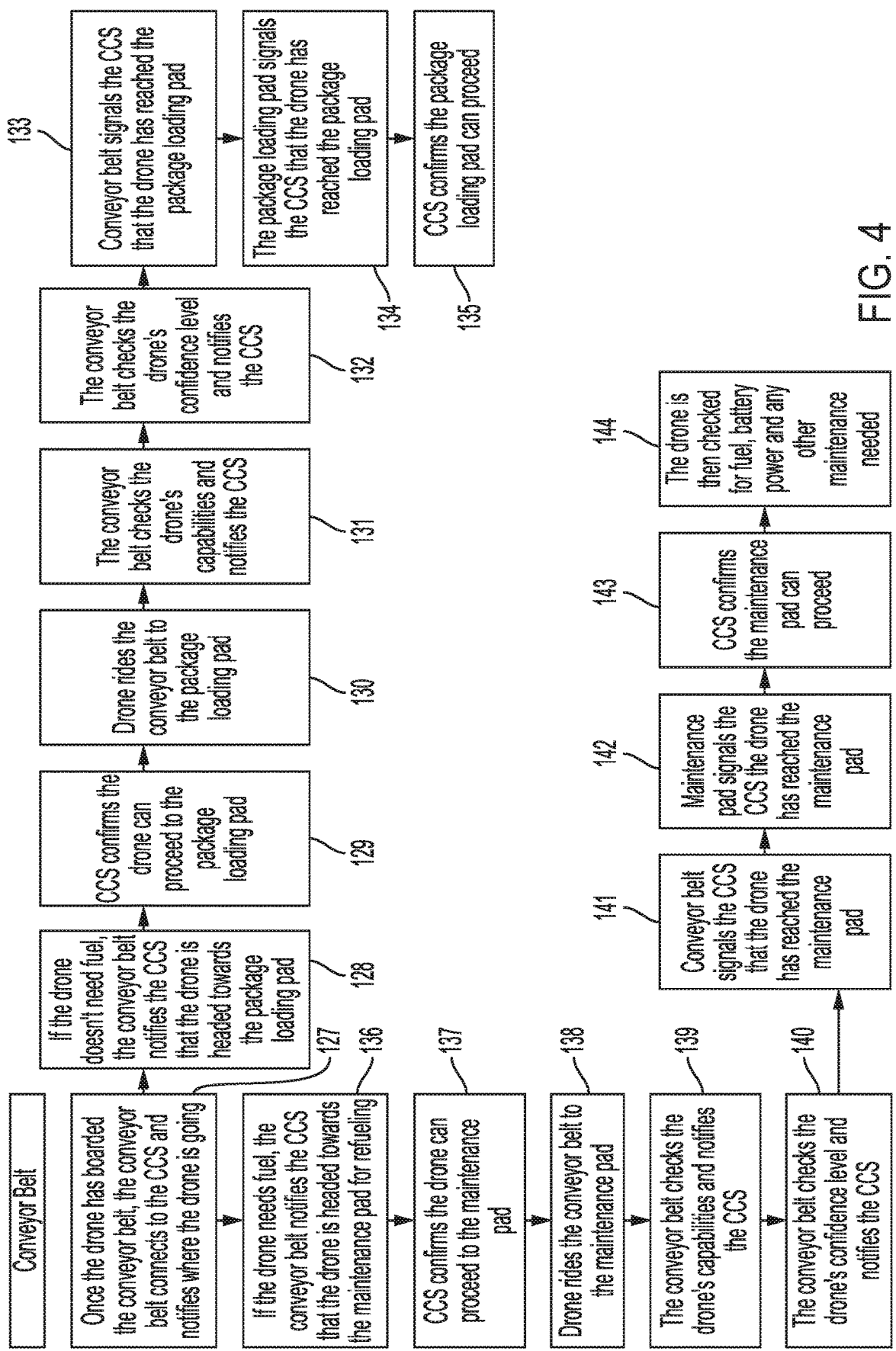

Referring now to FIG. 4, an exemplary flowchart illustrating communication between various components of the system 101 for determining appropriate transportation of the unmanned aerial vehicle 107 (each depicted in FIG. 1) is shown. Starting at step 127, once the unmanned aerial vehicle has boarded the first transportation mechanism or the second transportation mechanism, the first transportation mechanism and/or the second transportation mechanism can connect to the central server to notify where the unmanned aerial vehicle is going (i.e., the maintenance pad or loading pad). As shown in step 128, if the unmanned aerial vehicle does not need maintenance (e.g., fuel), the second mechanism can notify the central server that the unmanned aerial vehicle is headed toward the loading pad. At step 129, the central server can then confirm that the unmanned aerial vehicle is proceeding to the loading pad. At step 130, the unmanned aerial vehicle can ride the second transportation mechanism to the loading pad. While doing so, at step 131, the second transportation mechanism can check one or more capabilities of the unmanned aerial vehicle and notify the central server of such capabilities. At 132, the second transportation mechanism belt can check the confidence level of the unmanned aerial vehicle for performing up to its capabilities and notify the central server of its confidence level. Thereafter, at step 133, the second transportation mechanism can signal the central server that the unmanned aerial vehicle has reached the loading pad. At step 134, the loading pad can confirm that the unmanned aerial vehicle has reached the loading pad. Subsequently, at step 135, the central server can confirm that the loading pad may proceed in operating the loading pad, as will be discussed in more detail below.

However, if the unmanned aerial vehicle needs maintenance (e.g., fuel), at step 136, the first transportation mechanism can notify the central server that the unmanned aerial vehicle is headed towards the maintenance pad for maintenance (e.g., refueling). Thereafter, at step 137, the central server can confirm that the unmanned aerial vehicle may proceed to the maintenance pad. Subsequently, at step 138, the unmanned aerial vehicle can ride the first transportation mechanism to the maintenance pad. At step 139, while the first transportation mechanism carries the unmanned aerial vehicle to the maintenance pad, the first transportation mechanism can check one or more capabilities of the unmanned aerial vehicle and notify the central server of them. Thereafter, at step 140, while the first transportation mechanism carries the unmanned aerial vehicle to the maintenance pad, the first transportation mechanism can check a confidence level unmanned aerial level for maintenance and/or performing its capabilities, as described above.

Upon reaching the maintenance pad, at step 141, the first transportation mechanism can signal to the central server that the unmanned aerial vehicle has reached the maintenance pad. Also, at step 142, the maintenance pad can signal to the central server that the unmanned aerial vehicle has reached the maintenance pad. By doing so, at step 143, the central server can confirm that the maintenance pad may proceed and perform maintenance on the unmanned aerial vehicle. Accordingly, at step 144, the unmanned aerial vehicle is checked to determine the maintenance it needs.

Referring back to FIG. 1, the packaging system 145 can include a storage compartment 145 for storing one or more packages, and optionally, a placement mechanism 146 for placing the package on/in the storage compartment. The identifying system 149 can determine one or more properties of a package. The packaging system 149 and/or identifying system 149 can be located inside of a distribution center.

According to an embodiment, the packaging system 149 can be located inside of a distribution center, and the identifying system 149 can be located outside of a distribution center.

Along these lines, a transport mechanism 150 can transport a package from the storage compartment of the packaging system 145 to an identifying system 149 configured to identify one or more properties of the package. The placement mechanism 146 and/or the transport mechanism 150 can be a robotic arm. The robotic arm for the placement mechanism 146 and the transport mechanism 150 can move along separate tracks 147, 148. Moreover, the properties of the package that the identifying system 149 can include an identity, a size, a weight, dimensions, and/or a shape of the package. According to an embodiment, as illustrated, the identifying system 149 can be a weighing system configured to determine a weight of the package.

In operation, the packaging system 149 can be in communication with a computer (not illustrated). The computer may belong to distribution center and/or local store. Moreover, the computer can transmit one or more packages to be shipped and one or more capabilities of an unmanned aerial vehicle 107 to deliver the package. As such, the packaging system may receive a signal from the central server 106 via the computer to place a package on the identifying system 149. According to an embodiment, the central server 106 can request a specific package based on one or more characteristics of the package and/or unmanned aerial vehicle. According to another package, the computer can select a specific package based on one or more characteristics of the package and/or unmanned aerial vehicle. For example, the central server 106 can request, or the computer can select, a package based on receipt of an order, a weight of the package, dimensions of the package, and/or shape of the package.

The packaging system 149 can also connect to the loading station 104 and/or unmanned aerial vehicle 107. In doing so, the packaging system 149 can check the capabilities of one or more unmanned aerial vehicles on the loading pad to determine if the unmanned aerial vehicle at, or on its way, to the loading station 104 is compatible with the package. The packaging system 149 can also inform the unmanned aerial vehicle 107 and the central server 106 of the delivery destination of the unmanned aerial vehicle 107.

Along these lines, the packaging system 145 can determine a confidence level for the unmanned aerial vehicle 107 to deliver the package, as discussed above, prior to transportation of the package to the identifying system 149. The identifying system 149 can confirm such a confidence level for the unmanned aerial vehicle to delivery of the package to the loading station 104. Alternatively, the identifying system 149, and not the packaging system 145, may determine a confidence level for the unmanned aerial vehicle prior to delivery of the package to the loading station 104.

Moreover, upon the package being placed on the identifying system 149, a third transportation mechanism 176 can transport the package from the identifying system 149 to the loading station 104. Along these lines, the transportation mechanism can physically connect the weighing system 149 to the loading station 104. The third transportation mechanism 176 can include a conveyor belt or a plurality of rollers.

Figure 5:
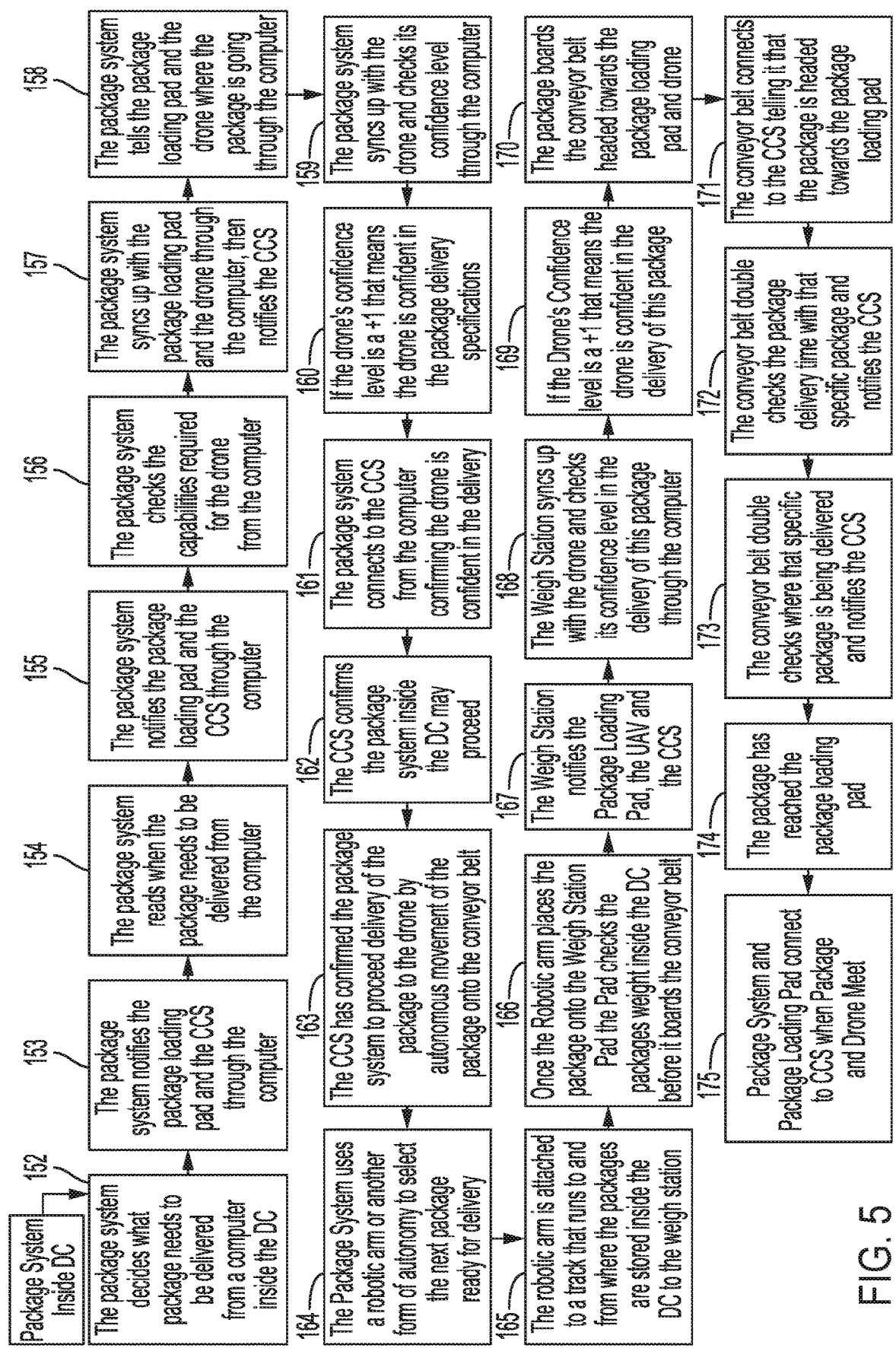

Referring now to FIG. 5, an exemplary flowchart illustrating the communication between various components of the system 101 for determining selection and shipment of a package by the packaging system 145 (each shown in FIG. 1) is illustrated. At step 152, the packaging system can determine what package needs to be delivered from a computer inside the distribution center. Thereafter, at step 153, the packaging system can notify the loading station and the central server, through the computer, of the package that needs to be delivered. Subsequently, at step 154, the packaging system can read a time at which the package needs to be delivered, from the computer. Upon doing so, at step 155, the packaging system can notify the loading station and the central server of such a time through the computer by, for example, comparing the package specification with the drone capabilities. At step 156, the packaging system can check one or more capabilities required for an unmanned aerial vehicle to deliver the package from the computer. At step 157, the packaging system can sync-up with the loading station and the unmanned aerial vehicle, and then, notify the central server that is has synced-up. At step 158, the packaging system can tell the loading station and the unmanned aerial vehicle the delivery destination of the package.

Subsequently, at step 159, the packaging system can sync-up with the unmanned aerial vehicle to check a confidence level for delivery of the package based on the package delivery specifications. At step 160, it can be determined if the confidence level of unmanned aerial vehicle for transporting the package is "+1" based on the package delivery specifications. At step 161, the packaging system can connect to the central server to confirm that the unmanned aerial is confident in delivery of the package. At step 162, the central server can confirm the packaging system inside the distribution center may proceed. At step 163, the central server can instruct a mechanism of the packaging system to autonomously move the package onto the conveyer belt. At step 164, the packaging system can use a robotic arm or another form of autonomy to select the next package for delivery. At step 165, the robotic arm can transport the package to a weighing station.

Upon placement of the package on the weighing station, at step 166, the weighing station can check the weight of the package. After doing so, at step 167, the weighing station can notify the loading station, the unmanned aerial vehicle, and the central server of the weight of the package. At step 168, the weighing station can sync-up with the unmanned aerial vehicle to check its confidence level for delivering the package. At step 169, the weighing station can confirm that the unmanned aerial vehicle has a confidence level of "+1" (meaning that it is confidence in delivery of the package). At step 170, the package can then board a conveyer belt for transportation to the loading pad. Upon placement on the conveyer belt, at step 171, the conveyer belt can connect to the central server to inform that the package is headed towards the conveyer belt. At step 172, the conveyer belt can double check the package delivery time with the package and notify the central server of such information. At step 173, the conveyor belt can check where the package is being delivered and notify the central server. At step 174, the package can then reach the loading station. Lastly, at step 175, the packaging system and loading pad can connect to the central server when the package and unmanned aerial vehicle meet, as will discussed in more detail below.

Referring back to FIG. 1, as discussed above the loading station 104 can be configured to receive the unmanned aerial vehicle 107 from the landing station 101 and to receive the package from the packaging system 145. As also discussed above, the packaging system 145 can send an appropriate package for the unmanned aerial to deliver to a delivery destination based on one or more properties of the package and one or more capabilities of the unmanned aerial vehicle 107. As such, the unmanned aerial vehicle 107 will meet, and attach to, the appropriate package to be delivered to the delivery destination at the loading station 104.

Alternatively, the loading station 104 can be configured to hold and maintain a plurality of packages. As such, when the unmanned aerial vehicle 107 arrives at the loading station 104, the landing station 104 can determine an appropriate package based on one or more properties of each package and one or more capabilities of the unmanned aerial vehicle 107. After determining the appropriate package, the unmanned aerial vehicle 107 can be instructed to attach to the package.

Figure 6:
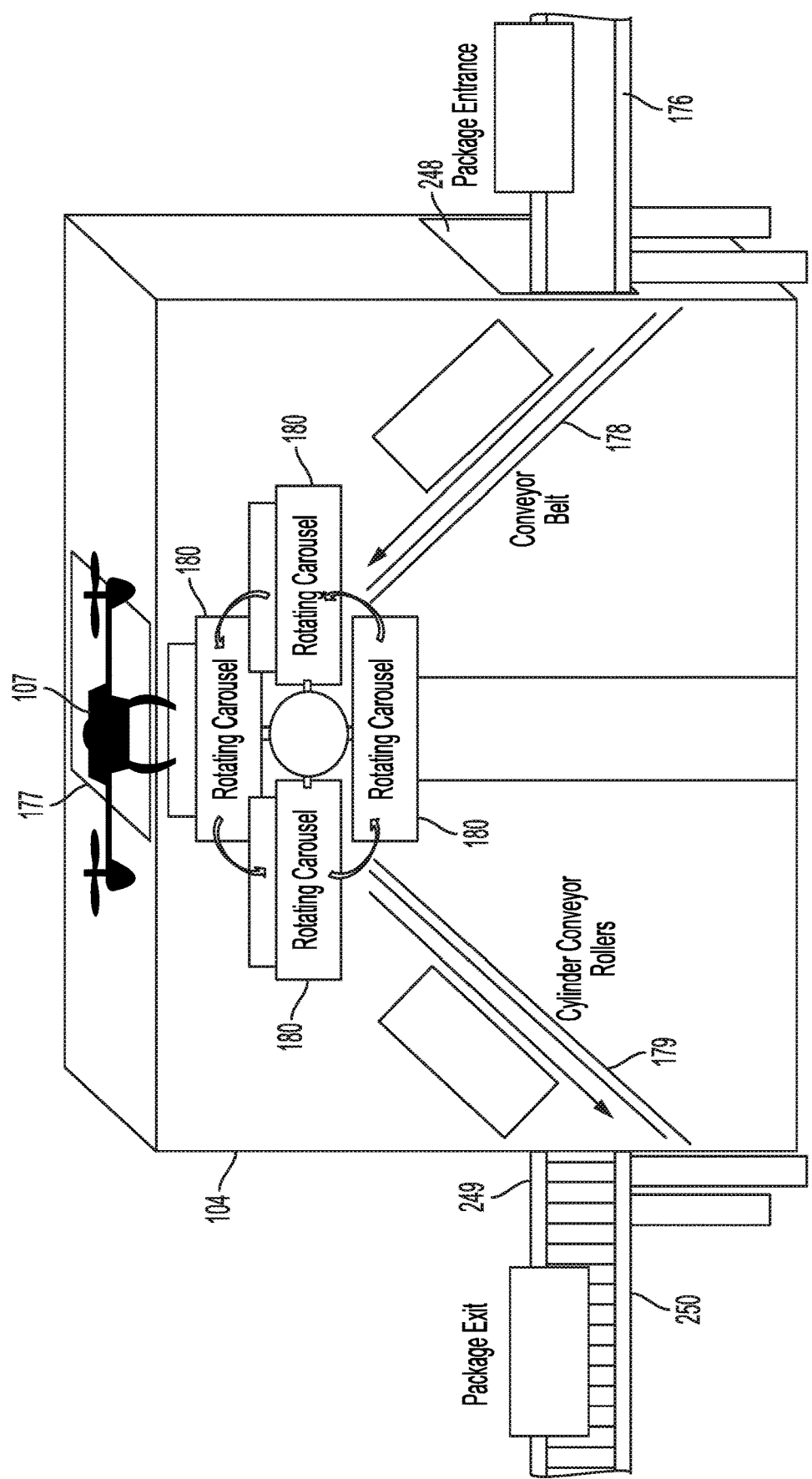
FIG. 6 illustrates of an exemplary loading station of the system depicted in FIG. 1 in accordance with embodiments of the invention.

Referring now to FIG. 6, an exemplary loading station 104 receiving and holding a plurality of packages is illustrated. As such, the loading station 104 may be a container. The container may have a trap door 177 for the unmanned aerial vehicle to land, a rotating carousel 180 having a plurality of shelves configured to each hold at a package, and/or a swivel (not illustrated) to orient the unmanned aerial vehicle 107 to pick-up and attach to the package. The trap door 177 can be configured to open and sized such that a portion of the unmanned aerial vehicle 107 utilized may enter into the container and grab, and attach to, the package inside the container. The rotating carousel 180 may be placed such that it may rotate and place each shelf directly beneath the trap door 177. This can allow the portion a portion of the unmanned aerial vehicle 107 utilized to grab, and attach to, the package to enter the container and have direct access to the package placed on the shelf directly beneath the trap door. This can also allow the loading station 104, the central server 106, and/or the packaging system 145 to select the appropriate package for the unmanned aerial vehicle 107 located on top of the loading station 104.

Moreover, the loading station 104 can include a first opening 248 and/or a second opening 249. The first opening 248 can permit the third transportation mechanism 176 to direct to a shelf of the rotating carousel 180. To do so, the loading station 104 may include a first transportation mechanism 178 extending from the third transportation mechanism 176 to a shelf of the rotating carousel 180. As to the second opening 249, it can permit the rotating carousel to get rid of any unwanted packages. To do so, the loading station may include a second transportation mechanism 179 extending from a shelf of the rotating carousel 180. The first and second transportation mechanisms 178, 179 can each include a plurality of rollers or a conveyer belt. According to an embodiment, the first transportation mechanism 178 includes a conveyer belt, and the second transportation mechanism 179 includes a plurality of conveyer belts.

Figure 7:
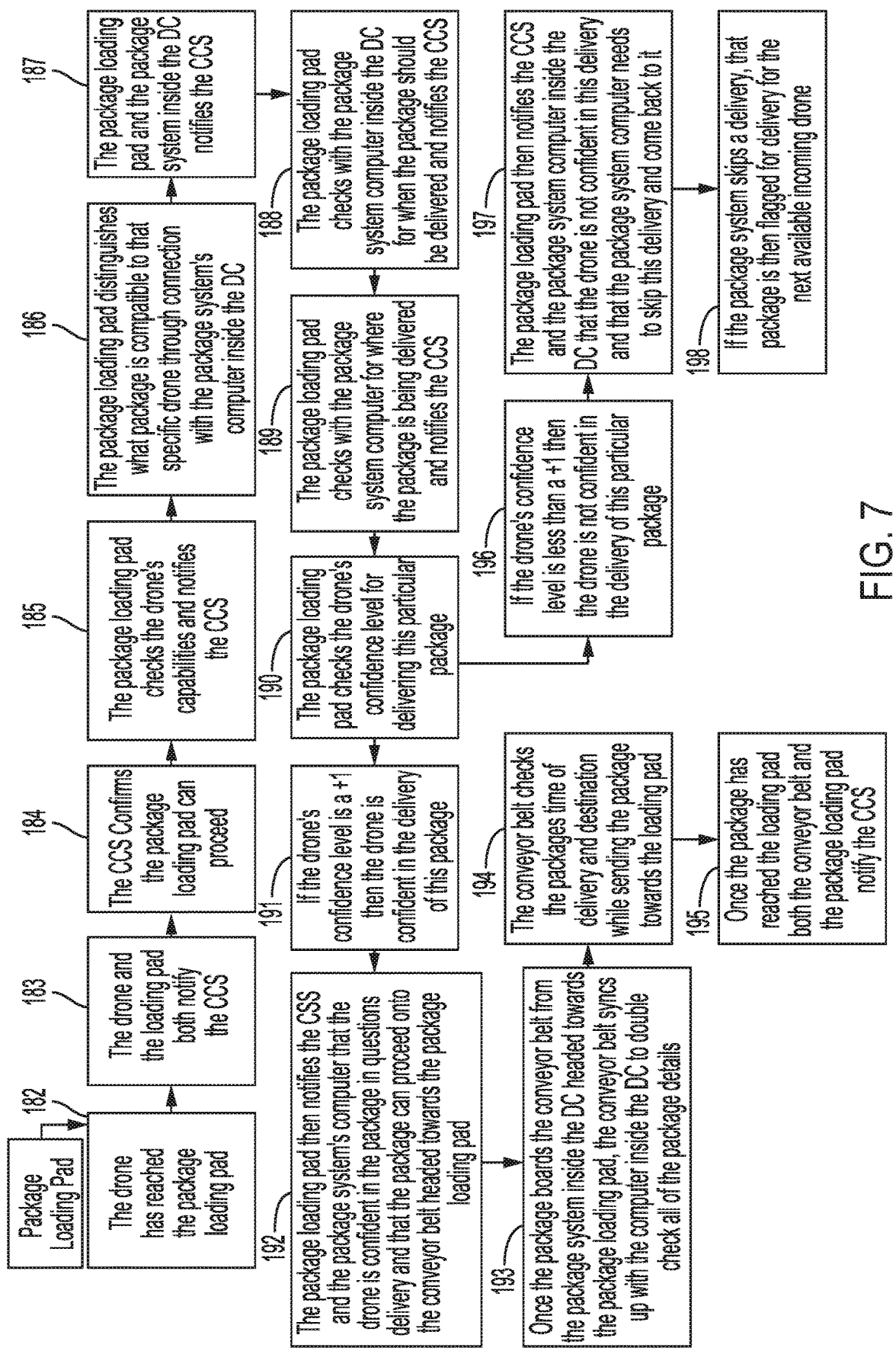

Referring now to FIG. 7, an exemplary flowchart illustrating communication between various components of the system 101 for managing selection of a package by an unmanned aerial vehicle 107 at the loading station 104 (each shown in FIG. 1) is depicted. At step 182, it can be determined if an unmanned aerial vehicle has reached a loading station. Thereafter, at step 183, the unmanned aerial vehicle and the loading station can each notify the central server if the unmanned aerial vehicle has reached the loading station. At step 184, the central server can confirm that the loading station may proceed with the loading process. At step 185, the loading station can check the unmanned aerial vehicles capabilities and notify the central server of such capabilities. At step 186, the loading station can distinguish what type package (e.g., size, dimension, and weight) available for delivery is compatible to the specific unmanned aerial vehicle. At step 187, the loading station and the packaging system inside the distribution center can notify the central server of the selected unmanned aerial vehicle.

Subsequently, at step 188, the loading station can check with the computer inside the distribution center to determine when the package should be delivered and notifies the central server of such information. At step 189, the loading station can check with the packaging system for where the package is being delivered and notifies the central server of such information. At step 190, the loading station can check the unmanned aerial's confidence level for delivering the package (e.g., "−1," "0," or "+1").

As described in step 191, if it is determined the confidence level for the unmanned aerial level to deliver the package is "+1," the unmanned aerial can be deemed confident in the delivery of the package. Thereafter, at step 192, loading station can notify the central server and packaging system that the unmanned aerial vehicle is confident in the delivery of the package, and as such, the package can proceed onto a conveyer belt heading towards loading pad. At step 193, the conveyer belt can sync-up with the computer inside the distribution center to double check the package details (i.e., size, weight, dimensions). At step 194, the conveyer belt can also determine a time of delivery and a destination for the package. At step 195, once the package has reached the loading station, both the conveyer belt and the loading station can notify the central server that the package has reached the loading station.

However, as described in step 194, if it is determined the confidence level for the unmanned aerial level to deliver the package is "−1" or "0," the unmanned can be deemed not confident in the delivery of the package. As such, at step 197, the loading station can notify the central server and the computer inside distribution center that the unmanned aerial vehicle is not confident in the delivery of the package and that the computer needs to skip this delivery and come back to it. Subsequently, at step 198, the package can be flagged for delivery for the next available unmanned aerial vehicle.

Figure 8:
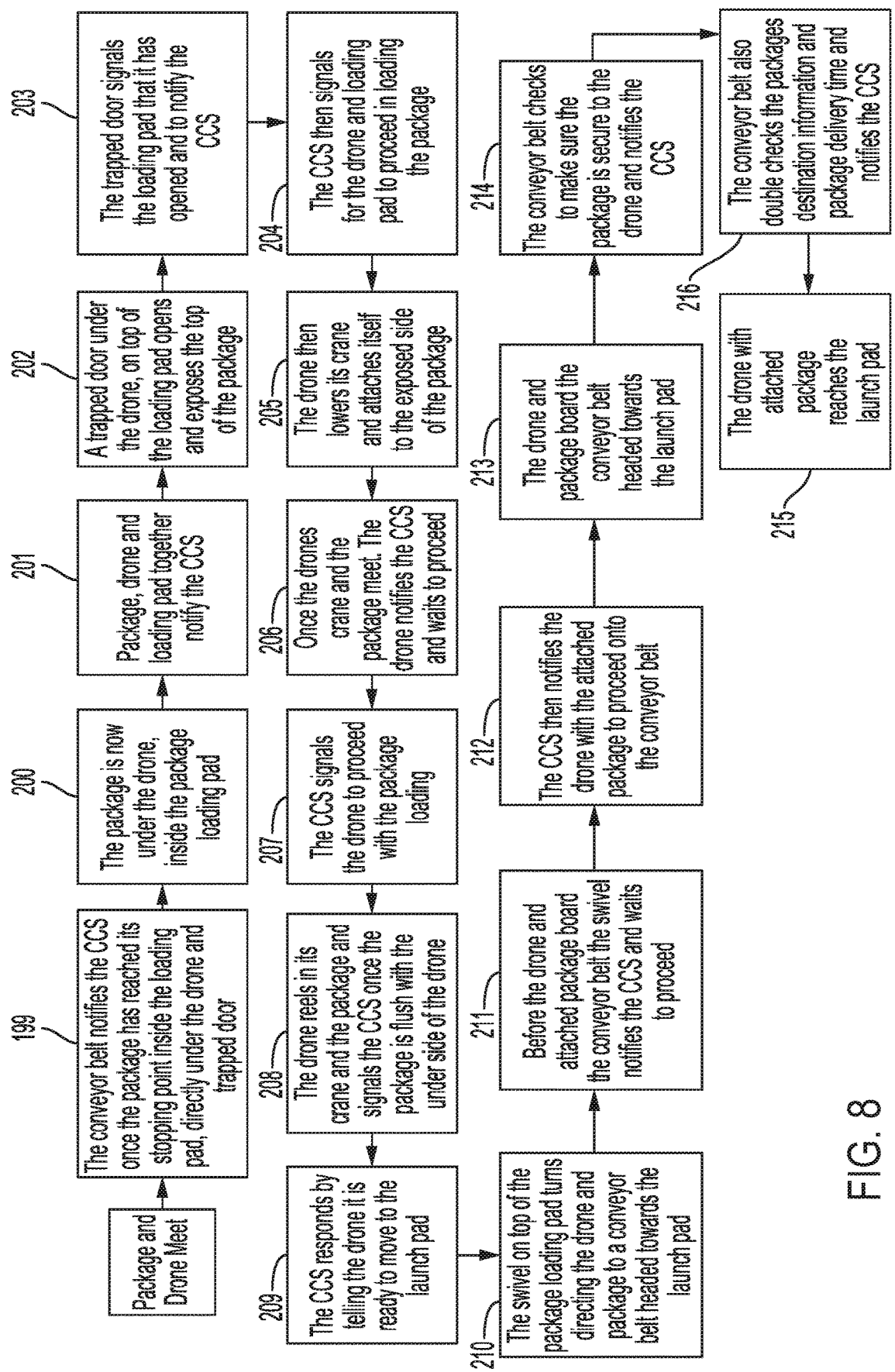

Referring now to FIG. 8, an exemplary flowchart illustrating communication between various components of the system 101 when a package and an unmanned aerial vehicle 107 meet at a loading station 104 (each shown in FIG. 1) is depicted. First, at step 199, a conveyer belt—transporting the package to the loading station—can notify a central server, once the package has reached a stopping point inside the loading pad directly under the unmanned aerial vehicle and trap door. At step 200, the package can now reside under the unmanned aerial vehicle inside the loading station. Subsequently, at step 201, the package, the unmanned aerial vehicle, and the loading station can together notify the central server that the package is currently under the unmanned aerial vehicle. At step 202, the trap door—under the drone and on top of the load pad—can open and expose the top of the package. At step 203, the trap door can send a signal to the loading pad that it has opened and to notify the central server. At step 204, the central server can then send a signal for the unmanned aerial vehicle and the loading station to proceed in loading the package.

In doing so, thereafter, at step 205, the unmanned aerial vehicle can then lower its crane and attach itself to the exposed side of the package. At step 206, once the crane of the unmanned aerial vehicle meets the package, the unmanned aerial vehicle can notify the central server. At step 207, the central server can then signal the unmanned aerial vehicle to proceed with loading the package. At step 208, the unmanned aerial vehicle can reel in the crane and the attached package, and then, signal to the central server once the package is flush with the underside of the unmanned aerial vehicle. At step 209, the central server can then respond by telling the unmanned aerial vehicle it is ready to move to the launch pad. At step 210, the swivel—located on top of the loading station—can turn to direct the unmanned aerial vehicle and the package to a conveyer belt headed towards the launching station.

Thereafter, at step 211, before the unmanned air vehicle and the attached package boards the conveyor belt, the swivel can notify the central server and wait to proceed to the conveyer belt. At step 212, the central server can then notify the unmanned aerial vehicle with the attached package to proceed onto the conveyor belt. At step 213, the unmanned aerial vehicle and the package can board the conveyor belt to head towards the launching station. At step 214, the conveyor belt can check to make sure the package is secured to the drone and notify the central server of such. At step 215, the conveyor belt can also double check the destination information and delivery time of the package and notify such to the central server. Lastly, at step 216, the unmanned aerial vehicle with the attached package can reach the launching station.

Referring back to FIG. 1, the launching station 105 can be connected to the loading station 104 by a fourth transportation mechanism 181. As such, the fourth transportation mechanism 181 can transport the unmanned aerial vehicle 107 and the package to the launching station 105. While being transported, the fourth transportation mechanism 181 can check the attachment of the package to the unmanned aerial vehicle. As such, upon arrival at the launching station 105, the launching station can check a confidence level for the unmanned aerial vehicle 107 to deliver the package, which can be done in the same manner as discussed above. Once the confidence level is confirmed, the launching station 105 can include a swivel to direct the unmanned aerial vehicle 107 towards its route and permit the unmanned aerial vehicle 107 to depart.

Figure 9:
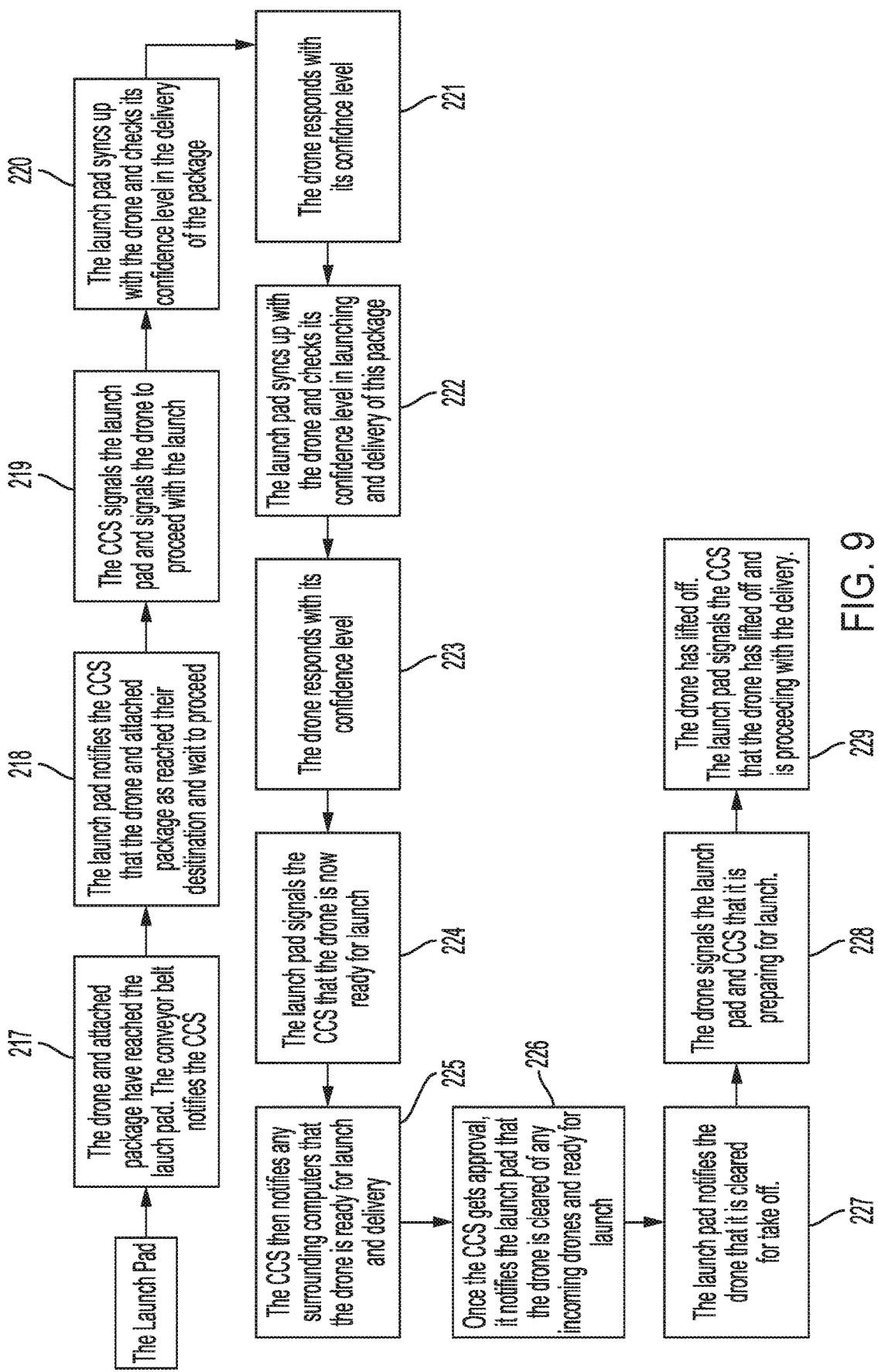

Referring now to FIG. 9, an exemplary flowchart illustrating communication between various components of the system 100 when a package reaches a loading station 104 (each shown in FIG. 1) is depicted. Beginning at step 217, once the unmanned aerial vehicle and the attached package reaches the launching station, the conveyer belt can notify the central server. At step 218, the launching station can notify the central server that the unmanned aerial vehicle and the attached package has reached the launching station and wait to proceed. As such, at step 219, the central server can signal the launching station and unmanned aerial vehicle to proceed with the launch.

Prior to launching the unmanned aerial vehicle, at step 220, the launching station can sync-up with the unmanned aerial vehicle and check a confidence level of the unmanned aerial vehicle in the delivery of the package to the destination. At step 221, the unmanned aerial vehicle can send its confidence level for delivering the package to the destination to the launching station. At step 222, the launching station can sync-up with the unmanned aerial vehicle and check its confidence in launching and delivery of the package to the destination. At step 223, the unmanned aerial vehicle can respond with confidence in launching and delivery of the package to the destination. At step 224, the launching station can signal to the central server that the unmanned aerial vehicle is now ready for launch. At step 225, the central server can then notify any surrounding computers that the unmanned aerial vehicle is read ready for launch and deliver.

Once the central server gets approval, at step 226, the central server can notify the launching station that the unmanned aerial vehicle is cleared of any incoming unmanned aerial vehicle and ready for launch. At step 227, the launching station can notify the unmanned aerial vehicle that it is cleared for take-off. At step 228, the unmanned aerial vehicle can signal the launching station and the central server that it is preparing for launch. Lastly, at step 229, the unmanned aerial vehicle can lift-off, and the launching station can signal to the central server that the unmanned aerial vehicle has lifted off and is proceeding with delivery of the package.

Figure 10:
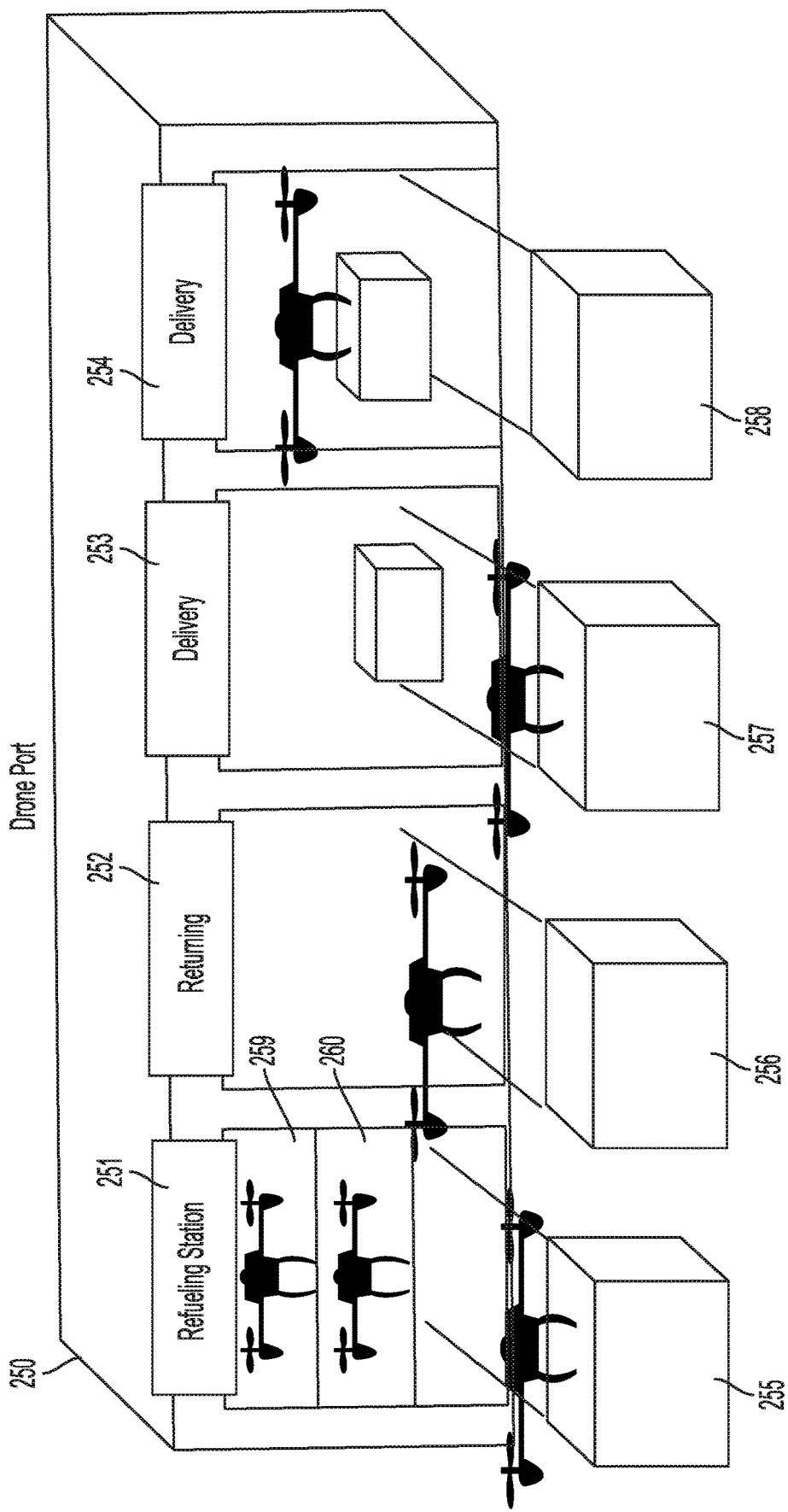

Referring now to FIG. 10, an exemplary unmanned aerial vehicle port 250 that can be utilize in accordance with embodiments of the present invention is illustrated. The port 250 can belong to a distribution center and/or local store. As such, the port 250 can include a plurality of stations 251-254. The stations 251-254 can be of the same or different. For example, one station 251 can be a "Refueling Station" that is used for refueling unmanned aerial vehicle ports. Another station 252 can be a "Returning" station used for unmanned aerial vehicles which return from delivery. Additional stations 253, 254 can be "Delivery" stations and used in accordance with embodiment of the invention discussed above. Moreover, the stations 251-254 can have a location outside of the port 250 for the unmanned aerial vehicles to land thereon prior to transportation to their respective station.

Figure 11:
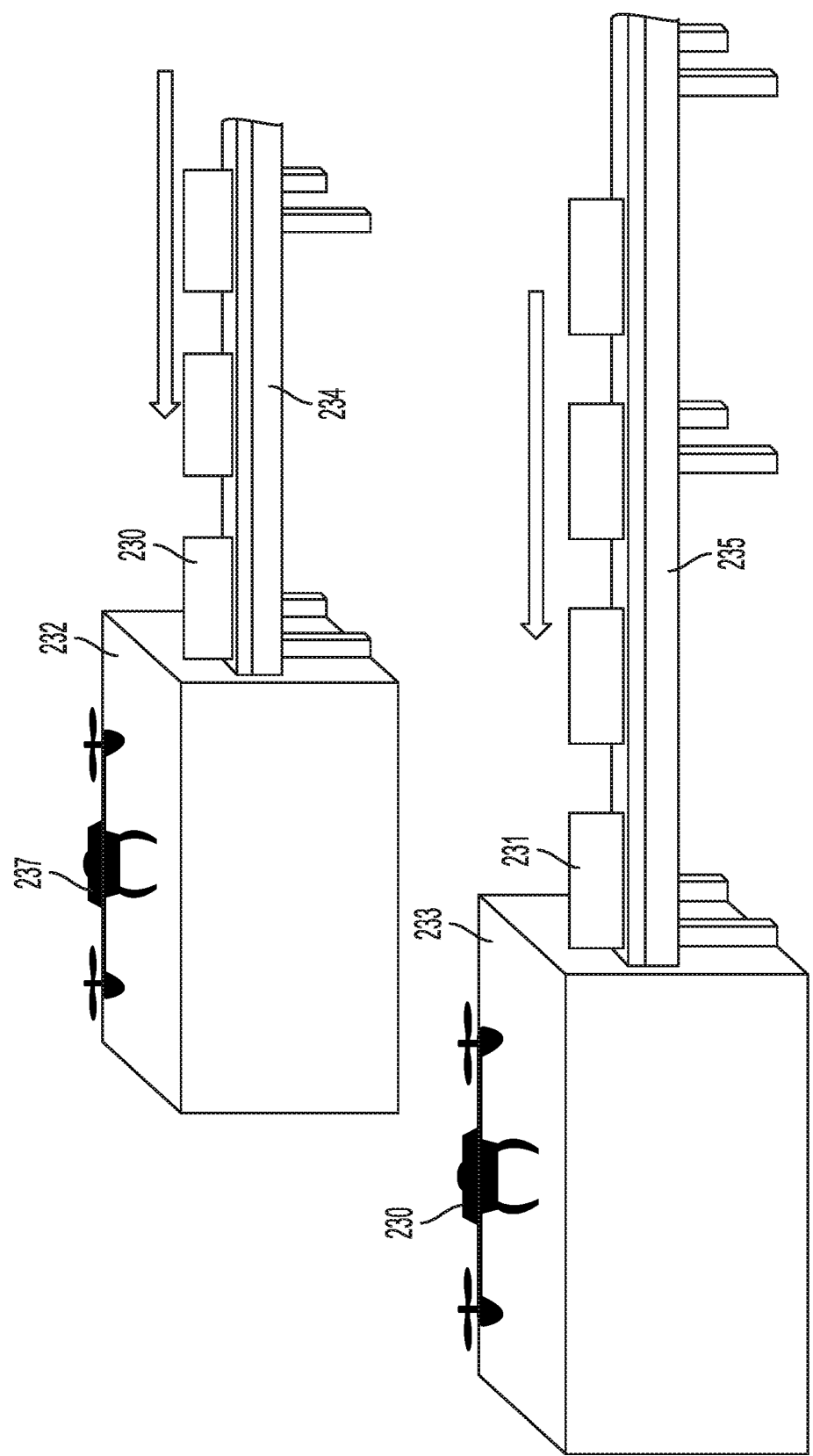

Referring now to FIG. 11, an exemplary system for simultaneously receiving multiple packages 230, 231 at different loading stations 231, 232 in accordance with embodiments of the present invention is illustrated. The packages 230, 231 can be place on different transportation mechanisms 234, 235 which connect to separate loading stations 231, 232. The transportation mechanism 234, 235 can connect the same or different identifying system (not illustrated) as discussed above with respect to FIG. 1. Along these lines, the transportation mechanisms 234, 235 can includes rollers and/or a conveyer belt. Moreover, the loading stations 232, 233 can operate the same as discussed above with respect to FIG. 1. This can allow unmanned aerial vehicles 236, 237 to select and attach to packages in the loading stations 231, 232 in the same manner as discussed above with respect to FIG. 1.

Figure 12:
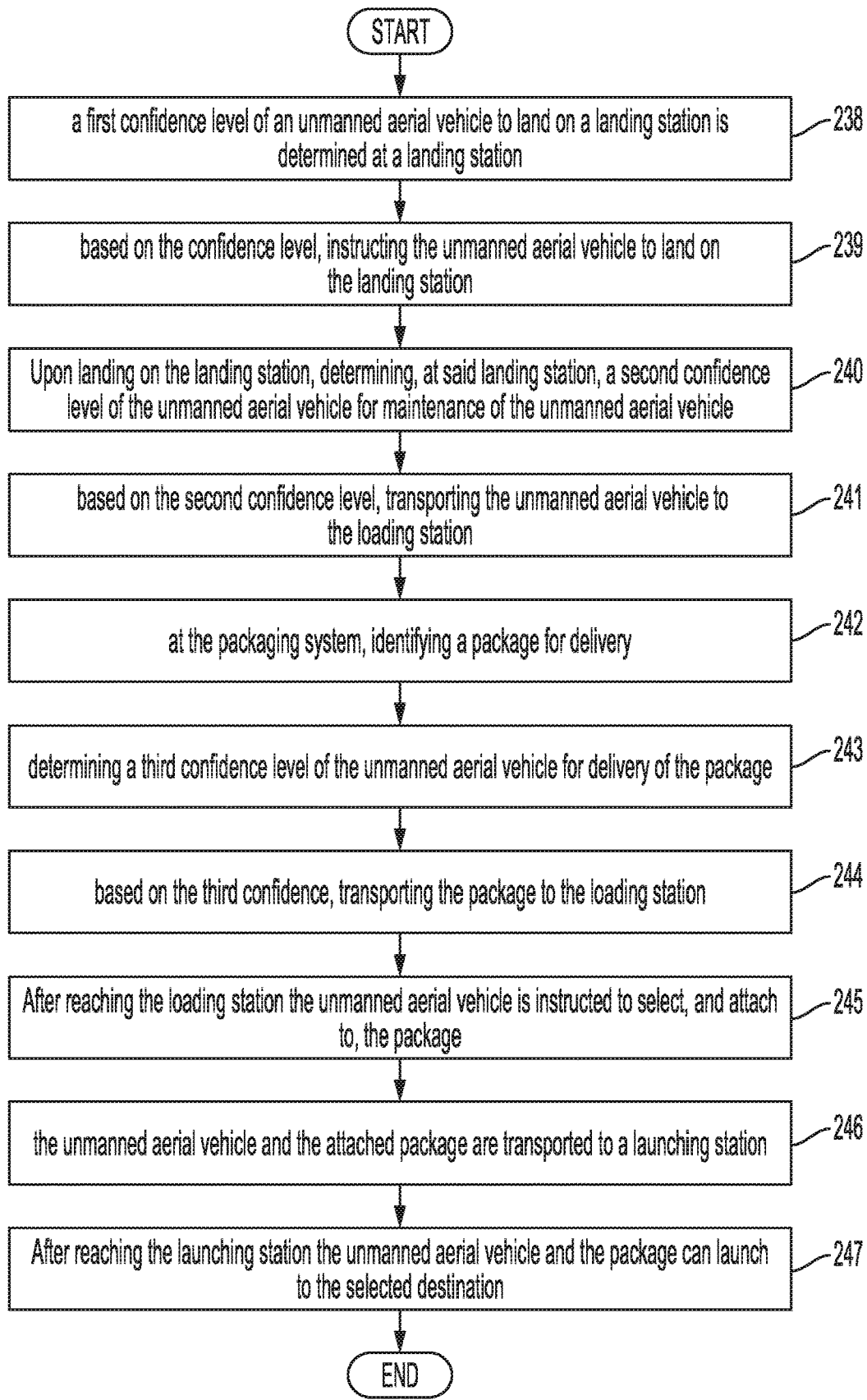
FIG. 12 illustrates an exemplary method for arranging one or more unmanned aerial vehicle for delivery of a package to a particular destination in accordance with embodiments of the present invention.

Referring now to FIG. 12, an exemplary method for controlling an unmanned aerial vehicle for delivery of a package to a particular destination that can be utilized in accordance with embodiments of the present invention is illustrated. First, at step 238, a first confidence level of an unmanned aerial vehicle to land on a landing station is determined at a landing station. Thereafter, at step 239, based on the confidence level, instructing the unmanned aerial vehicle to land on the landing station. Upon landing on the landing station, at step 240, determining, at said landing station, a second confidence level of the unmanned aerial vehicle for maintenance of the unmanned aerial vehicle. Thereafter, at step 241, based on the second confidence level, transporting the unmanned aerial vehicle to the loading station. Subsequently, at step 242, at the packaging system, identifying a package for delivery. Upon doing so, at step 243, determining a third confidence level of the unmanned aerial vehicle for delivery of the package. At step 244, based on the third confidence, transporting the package to the loading station. After reaching the loading station, at step 245, the unmanned aerial vehicle can be instructed to select, and attach to, the package. At step 246, the unmanned aerial vehicle and the attached package can be transported to a launching station. After reaching the launching station, at step 247, the unmanned aerial vehicle and the package can launch to the selected destination.

Figure 13:
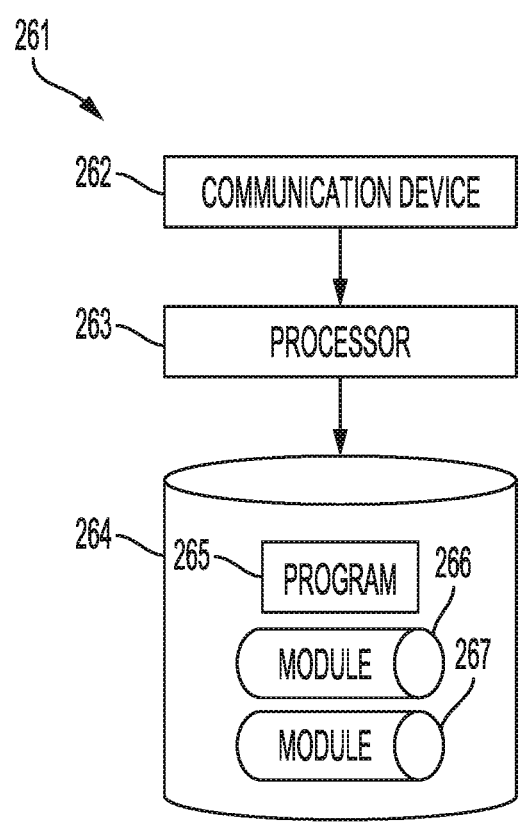
FIG. 13 illustrates a schematic diagram of an exemplary control server that can be utilized in accordance with embodiments of the present invention.

Referring now to FIG. 13, a schematic diagram of an exemplary server 261 that may be utilized in accordance with the present invention is illustrated. The exemplary server 261 includes a communication device 262, a processor 263, and a data storage or memory component 263. The processor 263 is in communication with both the communication device 262 and the memory component 264. The communication device 262 may be configured to communicate information via a communication channel, wired or wireless, to electronically transmit and receive digital data related to the functions discussed herein. The communication device 262 may also be used to communicate, for example, with one or more human readable display devices, such as, an LCD panel, an LED display or other display device or printer. The memory component 264 may include any appropriate information storage device, including combinations of magnetic storage devices (e.g., magnetic tape, radio frequency tags, and hard disk drives), optical storage devices, computer readable media, and/or semiconductor memory devices such as Random Access Memory (RAM) devices and Read-Only Memory (ROM) devices. The memory component 264 may store the program 265 for controlling the processor 263. The processor 263 performs instructions of the program 265, and thereby operates in accordance with the present invention.

The memory component 263 may also store and send all or some of the information sent to the processor 263 in a plurality of modules 266, 267. As such, the module 266, 267 may each contain data for each of the stations/systems discussed above. This can improve the logic and processing speed of the server 261 in coordinating unmanned aerial vehicles for delivery of one or more packages, as discussed in detail above.

Communication device 262 may include an input device including any mechanism or combination of mechanisms that permit an operator to input information to communication device 262, such as a keyboard, a mouse, a touch sensitive display device, a microphone, a pen-based pointing device, a biometric input device, and/or a voice recognition device. Communication device 262 may include an output device that can include any mechanism or combination of mechanisms that outputs information to the operator, including a display, a printer, a speaker, etc. Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for managing unmanned aerial vehicles, comprising:
an unmanned aerial vehicle;
a landing station for said unmanned aerial vehicle to land thereon; and
a loading station configured to receive a package and said unmanned aerial vehicle,
wherein said unmanned aerial vehicle is stationed away from said landing station and said loading station,
wherein said unmanned aerial vehicle is in communication with said landing station and configured to:
determine a first confidence level for landing on said landing station,
travel, based on said first confidence level, to said landing station, and
determine a second confidence level for delivering said package to a destination, and
wherein said loading station is in communication with said unmanned aerial vehicle and configured to:
receive said second confidence level to deliver said package to said destination from said unmanned aerial vehicle, and
confirm, based on said second confidence level, said unmanned aerial vehicle is capable of delivering said package to said destination.

2. The system of claim 1, wherein said unmanned aerial vehicle is configured to determine said second confidence level after being transported to said landing station.

3. The system of claim 1, wherein said loading station is configured to determine if said package is compatible with said unmanned aerial vehicle.

4. The system of claim 1, additionally comprising:
a central server in communication with said landing station and loading station,
wherein said central server is configured to:
monitor a location and status of said unmanned aerial vehicle and said package in said system, and
control transportation of said unmanned aerial vehicle and said package within said system.

5. The system of claim 4, additionally comprising:
a maintenance station for maintaining operation of said unmanned aerial vehicle,
wherein the maintenance station is in communication with said landing station and said central server,
wherein said maintenance station is configured to receive said unmanned aerial vehicle if said first confidence level is below a predefined threshold.

6. The system of claim 5, additionally comprising:
a first conveyor belt configured to transport said unmanned aerial vehicle to said maintenance station; and
a second conveyor belt configured to transport said unmanned aerial vehicle to said loading station,
wherein said first conveyor belt comprises first sensors which check maintenance of one or more components of the unmanned aerial vehicle, and
wherein the second conveyor belt comprises second sensors which check one or more capabilities of the unmanned aerial vehicle.

7. The system of claim 5, wherein the landing station comprises a rotating swivel attached to the landing station, the rotating swivel configured to rotate and align said unmanned aerial vehicle with said maintenance station or said loading station.

8. The system of claim 4, additionally comprising:
a computer for a distribution center;
a packaging system for a distribution center and comprising a storage for said package,
wherein said packaging system is in communication with the computer to determine one or more packages to be delivered,
wherein the packaging system is in communication with the central server to send said package to be delivered by said unmanned aerial vehicle.

9. The system of claim 8, additionally comprising:
an identifying system in communication with said packaging system and configured to identify one or more properties of the package,
wherein determining said second confidence level is based on said property of said package.

10. The system of claim 8, wherein determining said second confidence level is further based on one or more properties of said unmanned aerial vehicle.

11. The system of claim 1, additionally comprising:
a launch station separate from said landing station and said loading station, wherein said unmanned aerial vehicle departs from said launch station with said package to said destination.

12. The system of claim 11, wherein said loading station configured to receive said unmanned aerial vehicle from said landing station and to receive said package from a packaging system, wherein said unmanned aerial vehicle is configured to select said package at said loading station.

13. The system of claim 12, additionally comprising:
wherein said loading station comprises a rotating carousel and a trap door, the rotating carousel having a plurality of shelves configured to hold a package and be placed directly beneath the trap door, the trap door configured to open to permit said unmanned aerial vehicle to attach to said package.

14. The system of claim 1, wherein the first confidence level is −1, 0, or 1, wherein the first confidence level being −1 or 0 indicates that said unmanned aerial vehicle is not confident to land or deliver said package, and the first confidence level of +1 indicates that said unmanned aerial vehicle is confident to land or deliver said package.

15. A system for managing unmanned aerial vehicles, comprising:
an unmanned aerial vehicle;
a landing station for said unmanned aerial vehicle to land thereon,
a maintenance station in communication with said landing station and configured to perform maintenance on said unmanned aerial vehicle;
a packaging system comprising a storage for storing a plurality of packages; and
a loading station configured to receive said unmanned aerial vehicle from said landing station and to receive a package from said packaging system, said loading station in communication with said packaging system,
wherein unmanned aerial vehicle is configured to:
determine a first confidence level for landing on said landing station, and
travel, based on said first confidence level, to said landing station or said maintenance station,
wherein said loading station is configured to:
receive, from said landing station, said unmanned aerial vehicle,
receive, from said packaging system, said package,
determine a second confidence level for said unmanned aerial vehicle to deliver said package,
select, based on said second confidence level, said package for said unmanned aerial vehicle, and
instruct, based on said second confidence level, and unmanned aerial vehicle to select and attach to said package for delivery to a destination.

16. The system of claim 15, additionally comprising:
a maintenance station for maintaining operation of said unmanned aerial vehicle,
wherein the maintenance station is in communication with said landing station,
wherein said maintenance station is configured to receive said unmanned aerial vehicle if said first confidence level is below a predefined threshold.

17. The system of claim 16, wherein the unmanned aerial vehicle is configured to receive said package if the first confidence level is above the predefined threshold.

18. The system of claim 15, wherein the loading station comprises a plurality of packages including said package, said plurality of packages being stored on a plurality of shelves within the loading station, each shelf within the plurality of shelves holding a package from the plurality of packages.

19. A method for managing unmanned aerial vehicles, comprising:
determining, at a landing station, a first confidence level of an unmanned aerial vehicle to land on said landing station;
instructing, based on said first confidence level, said unmanned aerial vehicle to land on said landing station;
determining, at said landing station, a second confidence level of said unmanned aerial vehicle for maintenance;
transporting, based on said second confidence level, said unmanned aerial vehicle to a loading station;
identifying, at packaging system, a package for delivery;
determining, at said packaging system, a third confidence level of said unmanned aerial vehicle for delivery of said package;
transporting, based on said third confidence level, said package to said loading station;
instructing, at said loading station, said unmanned aerial vehicle to select and attach to said package;
transporting said unmanned aerial vehicle and said package to a launching station; and
launching, at said launching station, said unmanned aerial vehicle and said package to said destination.

* * * * *